United States Patent
Kim et al.

(10) Patent No.: US 9,625,969 B2
(45) Date of Patent: Apr. 18, 2017

(54) METHOD AND APPARATUS FOR CONTROLLING POWER CONSUMPTION OF A PORTABLE TERMINAL

(71) Applicant: Samsung Electronics Co., Ltd., Gyeonggi-do (KR)

(72) Inventors: Hyeongseok Kim, Seoul (KR); Byoungtack Roh, Gyeonggi-do (KR); Heesub Shin, Gyeonggi-do (KR); Seungyoung Jeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 248 days.

(21) Appl. No.: 14/335,484

(22) Filed: Jul. 18, 2014

(65) Prior Publication Data

US 2015/0033053 A1 Jan. 29, 2015

(30) Foreign Application Priority Data

Jul. 23, 2013 (KR) .................. 10-2013-0086738

(51) Int. Cl.
*G06F 1/32* (2006.01)

(52) U.S. Cl.
CPC .......... *G06F 1/3206* (2013.01); *G06F 1/3209* (2013.01); *G06F 1/3293* (2013.01); *Y02B 60/121* (2013.01)

(58) Field of Classification Search
CPC .... G06F 1/3206; G06F 1/3209; G06F 1/3293; Y02B 60/121
See application file for complete search history.

(56) References Cited

U.S. PATENT DOCUMENTS

| 9,063,731 B2 * | 6/2015 | Heo ................. G06F 1/3206 |
| 2007/0079161 A1 * | 4/2007 | Gupta ................ G06F 1/3203 |
| | | 713/324 |
| 2008/0012795 A1 | 1/2008 | Shim et al. |
| 2010/0070642 A1 * | 3/2010 | Bansal ................ H04L 69/22 |
| | | 709/230 |
| 2010/0137035 A1 | 6/2010 | Shan et al. |
| 2010/0313050 A1 | 12/2010 | Harrat et al. |

(Continued)

FOREIGN PATENT DOCUMENTS

| JP | 2013-020297 | 1/2013 |
| KR | 1020080005846 | 1/2008 |

OTHER PUBLICATIONS

International Search Report dated Nov. 3, 2014 issued in counterpart application No. PCT/KR2014/006661.

*Primary Examiner* — Abdelmoniem Elamin
(74) *Attorney, Agent, or Firm* — The Farrell Law Firm, P.C.

(57) ABSTRACT

A method for controlling a power consumption in a portable terminal and a portable terminal supporting the method are provided. The method includes receiving first data from at least one device, by a main processor; transmitting second data based on the received first data to a sub processor, by the main processor; receiving the second data from the main processor, and determining whether the main processor is in a sleep state, by the sub processor; and when it is determined that the main processor is in a sleep state, maintaining the sleep state of the main processor, receiving the first data from the at least one device, and controlling the at least one device based on the received first data and second data, by the sub processor.

14 Claims, 5 Drawing Sheets

(56) References Cited

U.S. PATENT DOCUMENTS

| | | |
|---|---|---|
| 2011/0019600 A1 | 1/2011 | Ping et al. |
| 2012/0260084 A1 | 10/2012 | Li et al. |
| 2014/0059365 A1* | 2/2014 | Heo .................. G06F 1/3206 713/320 |
| 2014/0351617 A1* | 11/2014 | Connell ............. G06F 1/3265 713/323 |

* cited by examiner

METHOD AND APPARATUS FOR CONTROLLING POWER CONSUMPTION OF A PORTABLE TERMINAL

PRIORITY

This application claims priority under 35 U.S.C. §119(a) to a Korean Patent Application filed on Jul. 23, 2013 in the Korean Intellectual Property Office and assigned Serial No. 10-2013-0086738, the entire content of which is incorporated herein by reference.

BACKGROUND

1. Field of the Invention

The present invention generally relates to a portable terminal, and more particularly, to a method and an apparatus for controlling power consumption that can save a power consumed in a portable terminal.

2. Description of the Related Art

Recently, portable terminals become necessities of modern life. As the portable terminal is able to provide a voice call service, various data transmission services, and various value-added services, it has been functionally transformed into and serves as a multimedia communication device. That is, when a user wants to execute a specific service, the user manually turns the portable terminal on and operates processors suitable to corresponding services to perform a multimedia communication service. However, such a manual input from the user delays real time synchronization, and causes an inconvenience that the user should manually operate each processor. Further, since the manually actuated processors are operated based on a turning-on of the portable terminal, a high power consumption of the portable terminal is required.

SUMMARY

The present invention has been made to solve at least the above-mentioned problems and/or disadvantages and to provide at least the advantages described below. Accordingly, an aspect of the present invention is to provide a method and an apparatus for controlling a power consumption using a processor of a portable terminal that can reduce a power consumption of the portable terminal.

In accordance with an aspect of the present invention, a method of controlling a power consumption in a terminal is provided. The method includes receiving first data from at least one device, by a main processor; transmitting second data based on the received first data to a sub processor, by the main processor; receiving the second data from the main processor, and determining a state of whether the main processor is in a sleep state, by the sub processor; and when it is determined that the main processor is in a sleep state, maintaining the sleep state of the main processor, receiving the first data from the at least one device, and controlling the at least one device based on the received first data and second data, by the sub processor.

In accordance with another aspect of the present invention, a method of controlling a power consumption in a terminal is provided. The method includes receiving first data from at least one device, by a main processor; determining a state of the main processor, by the sub processor; receiving the second data based on the first data from the main processor, by the sub processor, during a predetermined time before entering a sleep state of the main processor; and when the main processor is in the sleep state, maintaining the sleep state of the main processor, receiving the first data from the at least one device, and controlling the at least one device based on the received first data and second data, by the sub processor.

In accordance with another aspect of the present invention, an apparatus of controlling a power consumption in a terminal is provided. The apparatus includes a main processor and a sub processor. The main processor is configured to receive first data from at least one device, to control the at least one device based on the first data, and to transmit second data based on the first data to the sub processor, and the sub processor is configured to receive the second data from the main processor, to determine whether the main processor is in a sleep state, to maintain the sleep state of the main processor when it is determined that the main processor is in the sleep state, to receive the first data from the at least one device, and to control the at least one device based on the received first data and second data.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

The following description with reference to the accompanying drawings is provided to assist in a comprehensive understanding of various embodiments of the present invention as defined by the claims and their equivalents. It includes various specific details to assist in that understanding but these are to be regarded as mere examples. Accordingly, those of ordinary skill in the art will recognize that various changes and modifications of the various embodiments described herein can be made without departing from the scope and spirit of the present invention. In addition, descriptions of well-known functions and constructions can be omitted for clarity and conciseness. The terms and words used in the following description and claims are not limited to meanings in a dictionary, but are merely used to enable a clear and consistent understanding of the present invention. Accordingly, it should be apparent to those skilled in the art that the following description of various embodiments of the present invention is provided for illustration purposes only and not for the purpose of limiting the present invention as defined by the appended claims and their equivalents.

It can be understood that each block of the flowcharts and a combination of the flowcharts can be performed by computer program instructions. Since computer program instructions can be mounted in a processor of a universal computer, a special computer or other programmable data processing equipment, instructions performed through a processor of a computer or other programmable data processing equipment generates means for performing functions described in block(s) of the flowcharts. Since the computer program instructions can be stored in a computer available or computer readable memory capable of orienting a computer or other programmable data processing equipment to implement functions in a specific scheme, instructions stored in the computer available or computer readable memory can produce manufacturing articles involving an instruction means executing functions described in block(s) of flowcharts. Because the computer program instructions can be mounted on a computer or other programmable data processing equipment, a series of operation steps are performed in the computer or other programmable data processing equipment to create a process executed by the computer such that instructions performing the computer or other programmable data processing equipment can provide steps for executing functions described in block(s) of flowcharts. Further, each block can indicate a part of a module, a segment, or a code including at least one executable instruction for executing specific logical function(s). It should be noted that several execution examples can generate functions described in blocks out of an order. For example, two continuously shown blocks can be simultaneously performed, and the blocks can be performed in a reverse order according to corresponding functions.

Figure 1:
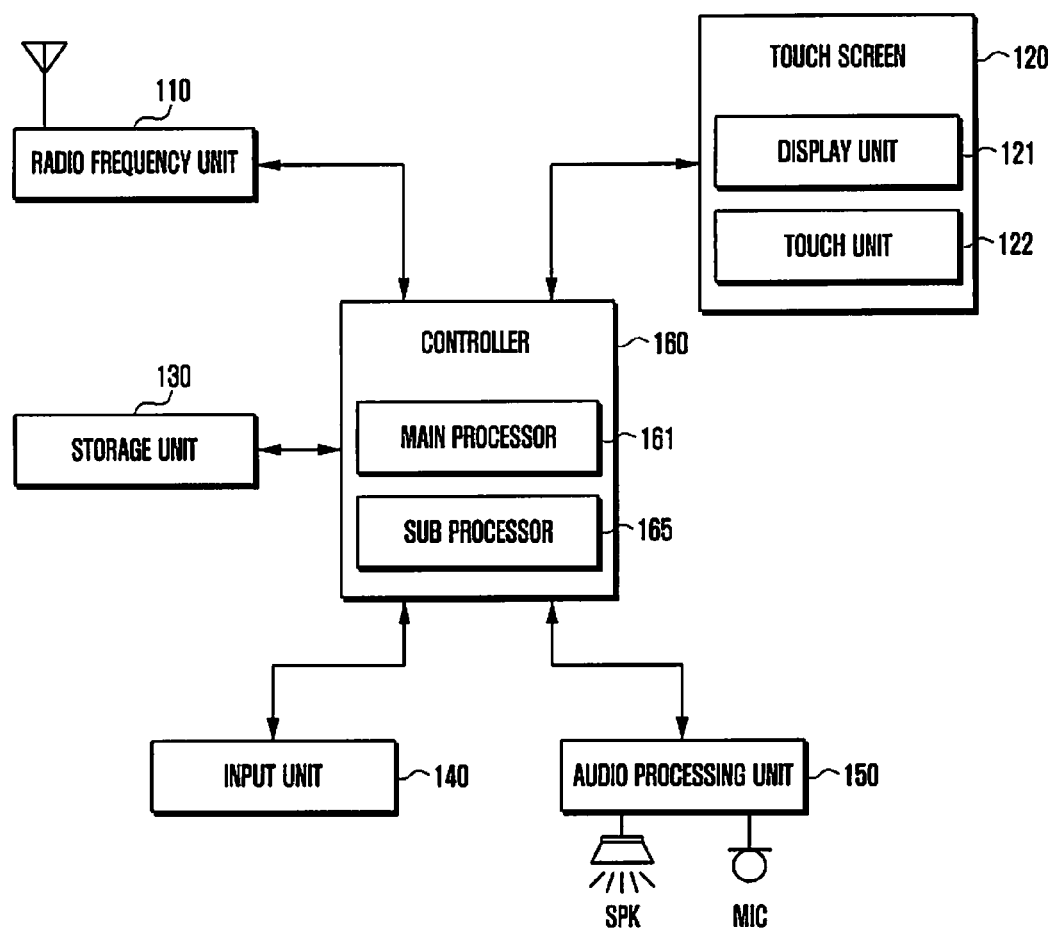
FIG. 1 is a block diagram schematically illustrating a configuration of a portable terminal according to an embodiment of the present invention.
Figure 2:
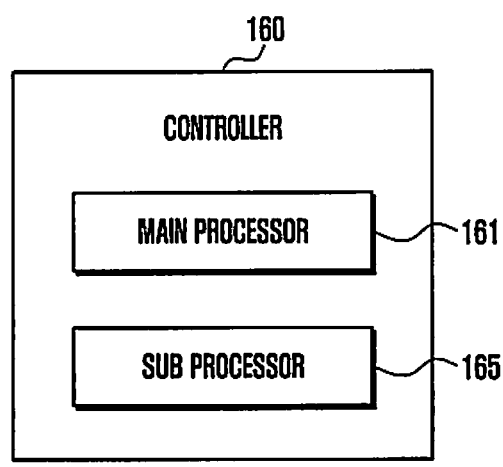
FIG. 2 is a block diagram illustrating a configuration of a controller of FIG. 1 according to an embodiment of the present invention in detail.

FIG. 1 is a block diagram illustrating a configuration of a portable terminal according to an embodiment of the present invention.

Referring to FIG. 1, a portable terminal of the present invention includes a radio frequency unit 110, a display unit 121, a touch unit 122, a storage unit 130, an input unit 140, an audio processing unit 150, and a controller 160.

The radio frequency unit 110 is a communication module to support a communication service of the portable terminal. That is, the radio frequency unit 110 can be a Global System for Mobile communication (GSM) module, a Code Division Multiple Access (CDMA) communication module, and the like, according to a mobile communication service method. Such a radio frequency unit 110 can form a communication channel with a mobile communication system. The radio frequency unit 110 can include a radio frequency transmitting unit for up-converting and amplifying a frequency of a transmitted signal and a reception unit for low-noise amplifying a received signal and down-converting a frequency.

The radio frequency unit 110 of the present invention is actuated by a main processor 161 or a sub processor 165 of the controller 160. In addition, the radio frequency unit 110 is used by the main processor 161 and the sub processor 165 to perform a transmission and reception with peripheral devices and other portable terminals. In particular, according to an embodiment of the present invention, the radio frequency unit 110 is actuated by the sub processor 165 when the main processor 161 is in a sleep state, and at this time, the sub processor 165 performs a transmission and reception with peripheral devices and other portable terminals by using the radio frequency unit 110.

The display unit 121 displays information input by the user or information provided to the user as well as various menus of the portable terminal. That is, the display unit 121 provides various screens according to a use of the portable terminal, for example, an idle screen, a menu screen, a message writing screen, a call screen, etc. The display unit 121 can be formed with a Liquid Crystal Display (LCD), an Organic Light Emitted Diode (OLED), etc. When the display unit is formed as a touch screen 120, the display unit 121 is included in an input means. When the display unit 121 is formed as a touch screen 120, a touch sensor disposed in the display panel is provided. The portable terminal can be provided, by the display unit 121, with various menu screens that can be performed on the touch screen 120 according to the support of the touch screen 120.

According to an embodiment of the present invention, when the portable terminal is turned on, the display unit displays the state of the peripheral devices which have been actuated by the sub processor 165 when the main processor 161 is in a sleep state, and is provided with data for the synchronization process of the peripheral devices controlled by the sub processor or data for the state of the peripheral devices when the main processor is in a sleep state. The state of the peripheral devices can refer to the turn-on, turn off, or standby state of the peripheral devices.

According to an embodiment of the present invention, the state of the peripheral devices can refer information detected by the peripheral devices. For example, the state the peripheral devices can refer information detected through the peripheral devices, such as temperature information detected by a temperature sensor, illumination information detected by an illumination sensor, communication information transmitted or received through a radio frequency unit 110, and so on.

The storage unit 130 stores an application for playing various stored files, a key map or a menu map for operation of the touch screen 120 as well as an application necessary for the function operation according to an embodiment of the present invention. Here, the key map and the menu map have various types. That is, the key map can be a keyboard map, a 3*4 key map, a QWERTY key map, etc. and can be a control key map for controlling an operation of a currently activated application. The menu map can be a control key map for controlling an operation of a currently activated application, can be a menu map for controlling an operation of a currently activated application, and can be a menu map can be provided with various menu items by the portable terminal.

According to an embodiment of the present invention, the storage unit 130 stores the state of the peripheral devices operated by the main processor 161 and the sub processor 165. For example, the storage unit 130 can store the information detected by the peripheral devices, such as connection information received through Wi-Fi communication. The storage unit 130 stores the state of the peripheral devices which are controlled, processed, and synchronized by the controller 160. Based on the stored state of the peripheral devices, the processors of the controller 160 synchronize the peripheral devices. When the main processor 161 is in a sleep state, the storage unit 130 stores the state of the peripheral devices operated by the sub-processor 165.

The input unit 140 includes a plurality of input keys and function keys for receiving an input of numeral or character information and setting various functions. The function keys include a direction key, a side key, and a shortcut key, and the like, each of which is set to perform a specific function. In addition, the input unit 140 generates a key signal related to a user setting and a function control of the portable terminal and transmits the generated key signal to the controller 160.

According to an embodiment of the present invention, the operating time of the main processor 161 or the sub processor 165 is adjusted according to a user input. That is, according to the user input, the main processor 161 and the sub processor 165 are controlled by the preset selection of the user such as a setting of processing time (e.g., when an operating time of the sub processor 165 is set to p.m. 10:00~a.m. 7:00, the sub processor 165 processes and controls the peripheral devices only at p.m. 10:00~a.m. 7:00 when the main processor 161 is in a sleep state) processed by the sub processor 165 when the main processor 161 is in a sleep state, and a preset selection of peripheral devices (e.g., when user selects only an audio and an atmospheric pressure sensor, the sub-slip processor 165 processes and controls only the audio and the atmospheric pressure sensor when the main processor 161 is in a sleep state).

The audio processing unit 150 includes a speaker (SPK) to output an audio signal transmitted from the controller 160, and a microphone (MIC) to collect the audio signal according to an activation of a specific application of the portable terminal. The audio processing unit 150 outputs the audio signal received through a radio frequency when the radio frequency unit 110 is activated.

According to an embodiment of the present invention, the audio processing unit 150 performs an operation and a data transmission by the main processor 161 or the sub processor 165. When the main processor 161 is in a sleep state, the operation and the data transmission of the audio processing unit 150 are performed by the sub processor 165.

The controller 160 supports to perform an initialization process by controlling a power supply to each element of the portable terminal, transmits and receives data from the peripheral devices upon a completion of the initialization process. The controller 160 of the present invention includes the main processor 161 and the sub processor 165.

The main processor 161 generally controls an interface and devices included in the portable terminal, and controls the transmission and reception with external devices. The sub processor 165 controls the interface and devices included in the terminal device with a low power compared to the main processor 161, and controls the transmission and reception with the external devices. According to an embodiment of the present invention, the main processor 161 receives data from the peripheral devices of the portable terminal. Here, the peripheral devices of the portable terminal can include a volatile memory and a nonvolatile memory capable of storing a certain data, can include a device such as a LCD, and a Light Emitting Diode (LED) that can display a data or a text, an icon, and the like, can include a resistive touch screen 120 and a capacitive touch screen 120, and can include an illumination sensor, a proximity sensor, a RGB sensor, an acceleration sensor, a geomagnetic sensor, a temperature sensor, a pressure sensor, a grip sensor, and the like. The peripheral devices of the portable terminal can also include an audio device such as a microphone, a speaker, a vibrator, and the like, and include one or more cameras. Communication can be performed through a wireless communication module such as 3-Generation (3G) communication, a short distance communication module such as Bluetooth (BT), Wireless Fidelity (WiFi), Near Field Communication (NFC), etc., and a wired and wireless communication module such as Universal Serial Bus (USB), Universal Asynchronous Transmitter (UART), but is not limited thereto.

According to an embodiment of the present invention, the main processor 161 receives data related to the peripheral device from the peripheral devices of the portable terminal. The data related to the peripheral device refers to data, a code, a form, and the like, that can process and control the peripheral devices, and the main processor 161 can receive such data. The main processor 161 transmits communication data including the received data and connection information that can be transmitted to the outside, such as a certain terminal, and other devices, to the sub processor 165.

According to an embodiment of the present invention, the sub processor 165 receives communication data including the data related to the peripheral device and the connection information that can be transmitted to the outside, and determines whether the main processor 161 is in a sleep state. The sleep state refers to a state in which only minimum operation of the main processor 161 is performed. The sleep state can refer to the state that when the portable terminal is turned off, when a screen of the display unit is turned off, and when a touch unit for input is inactivated. The portable terminal is turned on by pressing the turn-on input unit 140 by the user, and a data and call standby state can be implemented according to a preset data transmission and reception method.

According to an embodiment of the present invention, when it is determined that the main processor 161 is not in a sleep state, the main processor 161 continuously receives data from the peripheral devices, and processes and controls the received data. When the sub processor 165 determines that the main processor 161 is in the sleep state, the sub processor 165 maintains the sleep state of the main processor 161, and receives data that can be independently processed from the peripheral devices, and controls the peripheral devices. The sub processor 165 processes and controls the peripheral devices of the portable terminal based on the received data, and transmits data based on the data received from the peripheral devices and the data received from the main processor to a certain communication module, but is not limited thereto, and can perform a transmission and reception with another portable terminal, an access point (AP), and a separate external device.

The power control method of the sub processor 165 according to an embodiment of the present invention will be illustrated. Here, it is assumed that data received from a temperature sensor and a pressure sensor included in the portable terminal is periodically transmitted to a heating and cooling server. The main processor 161 then transmits or receives data before entering the sleep state. The main processor 161 transmits connection information related to the communication module together with the collected data of the temperature sensor and the pressure sensor to the sub processor module 165 immediately before entering the sleep state. The sub processor 165 receives the connection information together with the data of the temperature sensor and the pressure sensor, and determines whether the main processor 161 is in the sleep state. When the sub processor 165 determines that the main processor 161 is in the sleep state, it maintains the sleep state of the main processor 161. If the data is received from the temperature sensor and the pressure sensor, the sub processor 165 processes the data to transmit to the communication module, based on the received data of the sensors and the communication module connection information. The process necessary to transmit the processed data to the communication module can be performed by the sub processor 165.

According to an embodiment of the present invention, the sub processor 165 can output third data based on first data received from at least one peripheral device and second data from the main processor 161. For example, the first data received from at least one peripheral device can refer to data for state of the peripheral device, such as temperature data detected by a temperature sensor, grip data detected by grip sensor, and so on. The third data can be data for a synchronization process controlled by the sub processor 165 or data for a state of the at least one peripheral device when the main processor 161 is not in the sleep state. For example, the sub processor 165 can control the at least one peripheral device based on the third data.

According to an embodiment of the present invention, the portable terminal collects biometric data such as heart beat and other data through a connection of a USB or a BT to a WiFi communication network. In this case, the main processor 161 collects biometric data such as heart beat, and other data, and the sub processor processes and controls the biometric data and other data to the communication module when the main processor 161 is in the sleep state.

According to an embodiment of present invention, when the location of the terminal received from an acceleration sensor and a geomagnetic sensor included in the portable terminal is periodically transmitted to the outside by using a 3G, a WiFi, and the like, a communication is performed only by the sub processor 165 without waking up the main processor 161.

According to an embodiment of the present invention, when a Voice over Internet Protocol (VoIP) is used through the communication module, the user transmits and receives a voice through a microphone and a speaker of the terminal. During the use of the VoIP by the user, the main processor 161 transmits the data received from the VoIP of the main processor 161 and connection information relating to the data communication module to the sub processor 165 before entering the sleep state. The sub processor 165 receives the data, and determines that the main processor 161 is in the sleep state. The sub processor 165 then maintains the sleep state of the main processor 161, controls the data of the microphone, the speaker or the earphone connected to the interface based on the received data, and controls the communication module, the WiFi communication to perform a VoIP communication with a low power without waking up the main processor 161.

According to an embodiment of the present invention, when the main processor 161 is in the sleep state, the sub processor 165 performs an operation of receiving a streaming data (e.g., music) using the WiFi to output to the speaker or transmits the data through a Bluetooth headset, or a Bluetooth speaker.

Figure 3:
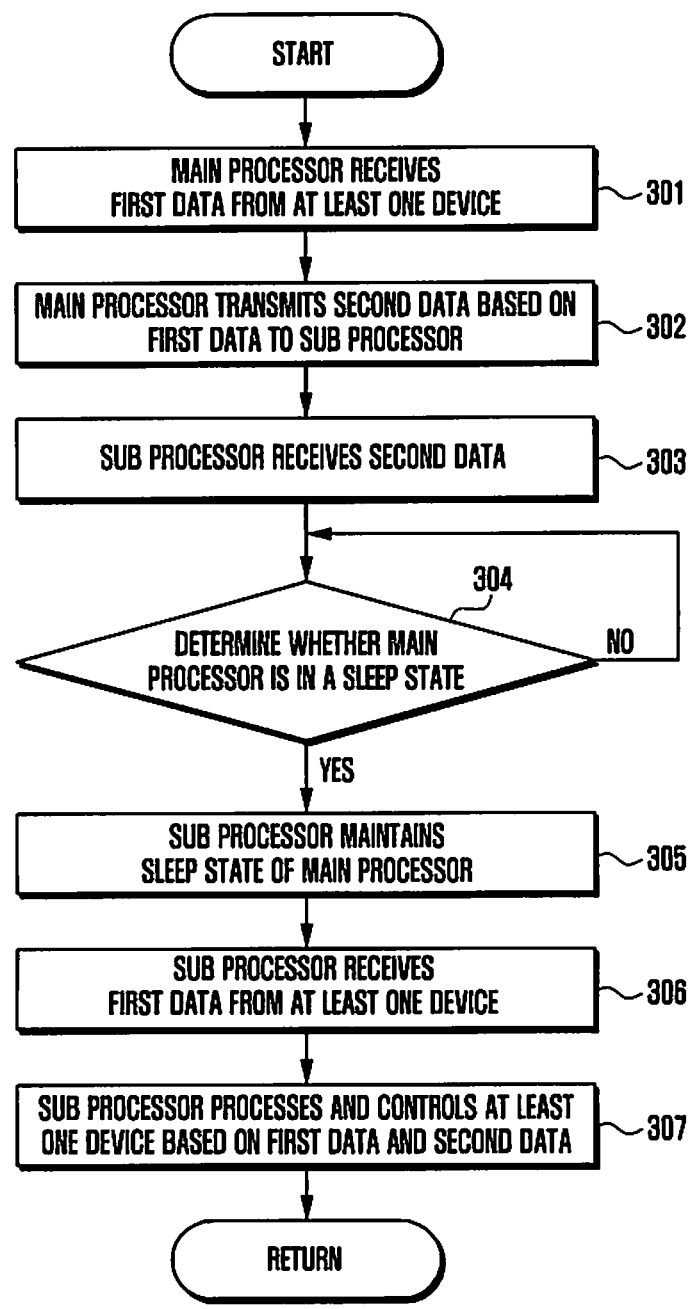
FIG. 3 is a flowchart illustrating an operation of a controller according to an embodiment of the present invention.

FIG. 3 is a flowchart illustrating an operation of a controller 160 according to an embodiment of the present invention.

The main processor 161 receives first data from at least one device at step 301. Here, the first data can be a data, a form, a code, and the like, that can be processed or used to control at least one device. The main processor 161 transmits second data based on the received first data to the sub processor 165 at step 302.

Here, the second data can be connection information of the first data and the communication module. The sub processor 165 receives the second data from the main processor 161 at step 303, determines whether the main processor 161 is in a sleep state at step 304. When the main processor 161 is in the sleep state, the sub processor 165 maintains the sleep state of the main processor 161 at step 305. The sub processor 165 receives the first data from the at least one device at step 306. The sub processor 165 processes and controls the at least one device based on the received first data and the second data at step 307. In addition, the sub processor 165 can output through an interface based on the received first data and the second data.

Figure 4:
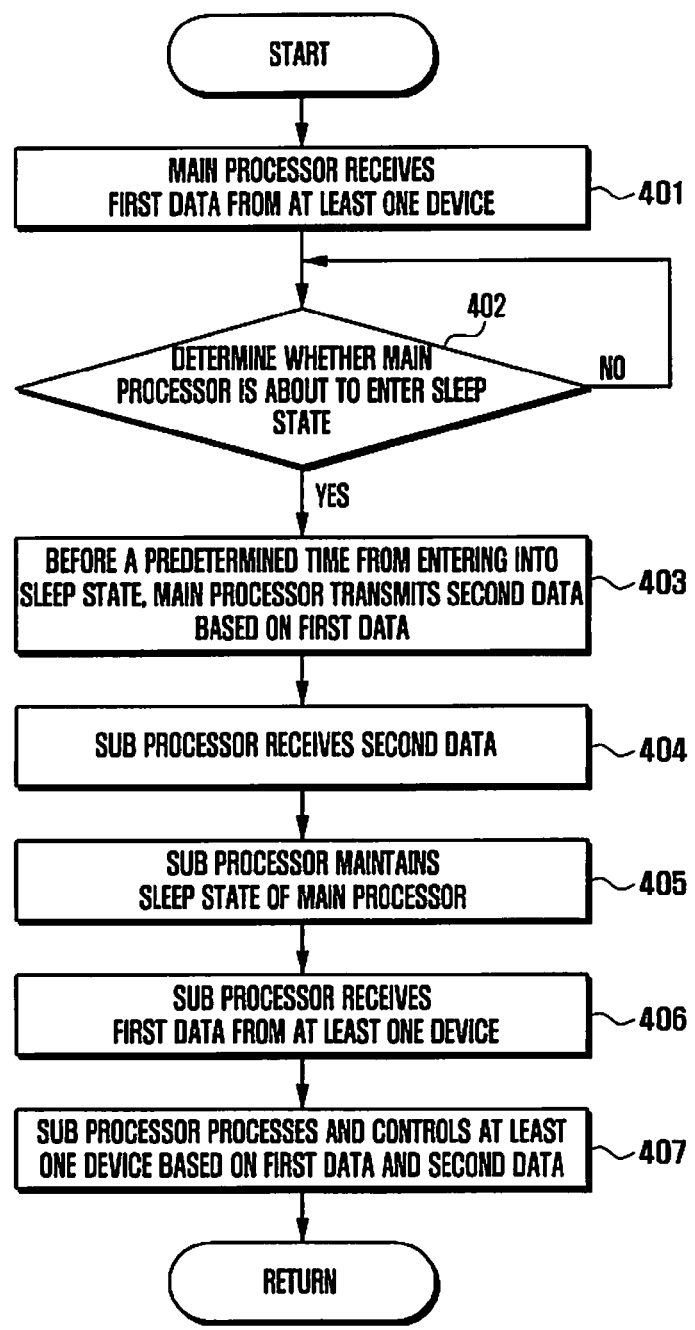
FIG. 4 is a flowchart illustrating an operation of a controller according to an embodiment of the present invention.

FIG. 4 is a flowchart illustrating an operation of a controller 160 according to an embodiment of the present invention.

The main processor 161 receives the first data from at least one device at step 401. Here, the first data can be a data, a form, a code, and the like, that can process or control at least one device. The sub processor 165 determines whether the main processor 161 is about to enter the sleep state at step 402.

When the main processor 161 is about to enter the sleep state, during a predetermined time before entering the sleep state, the main processor 161 transmits the second data based on first data to the sub processor 165 at step 403.

The sub processor 165 receives the second data based on the first data from the main processor 161 at step 404. Here, the second data can be connection information of the first data and the communication module. When the main processor 161 is in the sleep state, the sub processor 165 maintains the sleep state of the main processor 161 at step 405. The sub processor 165 receives the first data from the at least one device at step 406. The sub processor 165 processes and controls the at least one device based on the received first data and the second data at step 407.

Figure 5:
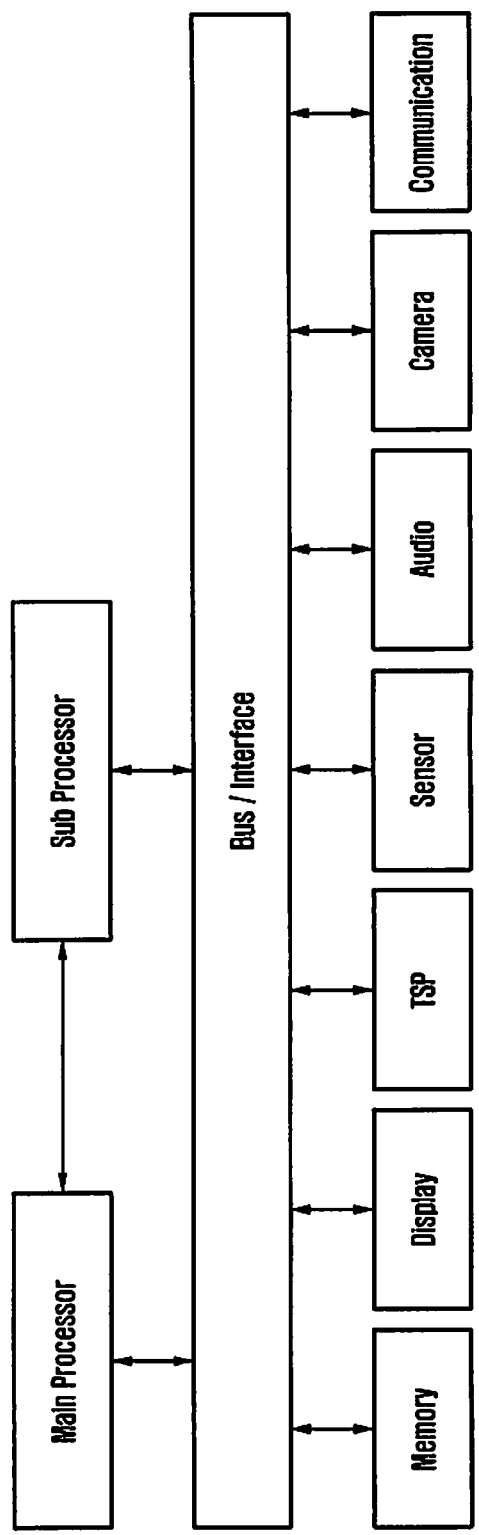
FIG. 5 is a diagram illustrating an operation of a controller of a portable terminal according to an embodiment of the present invention.

FIG. 5 is a diagram illustrating an operation of a controller 160 of a portable terminal according to an embodiment of the present invention.

According to an embodiment of the present invention, the main processor 161 and the sub processor 165 of the portable terminal controller 160 performs a data transmission and reception with peripheral devices such as a memory, a display unit (Display), a TSP, a sensor, an audio unit (Audio), a camera, and a communication module (Communication). The main processor 161 and the sub processor 165 receive data from the peripheral devices, and the main processor 161 transmits data received from peripheral devices to the sub processor when the main processor 161 is in a sleep state. The sub processor 165 receives data from the main processor 161, and maintains the sleep state of the main processor 161.

The sub processor 165 then processes and controls the at least one device based on the data received from the peripheral devices and the data received from the main processor 161, and transmits to and receives from a certain communication module. The main processor 161 or the sub processor 165 can mutually interchange the operation of the processor and control the peripheral devices in order to reduce the power.

According to the method of controlling a power consumption of an electronic device including the main processor 161 and the sub processor 165, the sub processor 165 can determine whether the main processor 161 is in a sleep state. When it is determined that the main processor 161 is in a sleep state, the sub processor 165 maintains the sleep state of the main processor 161, and transmits and receives information from a plurality of devices inside of the electronic device and/or external devices to control the plurality of devices. Here, the sub processor 165 can transmit the information received from the plurality of devices inside of the electronic device through a preset communication module. Further, the sub processor 165 can output the above mentioned information to a certain interface of the electronic device.

According to the present invention, the power consumption of the portable terminal can be reduced. Further, by reducing the power consumption of the portable terminal, less heat from the portable terminal is generated so as to increase a life of the portable terminal.

Further, data can be transmitted and received with a low power in a sleep state of the portable terminal such that a control of peripheral devices can be maintained and the power consumption of the portable terminal can be reduced.

Further, the user does not need to manually process and control the peripheral devices and does not need to determine a transmission and reception for each device, and at least one device is synchronized by a control processor of the portable terminal. Accordingly, convenience and usability of the user's portable terminal can be increased.

Although embodiments of the present invention have been described in detail hereinabove, it should be clearly understood that many variations and modifications of the present invention herein taught which can appear to those skilled in the present art will still fall within the spirit and scope of the present invention, as defined in the appended claims and their equivalents.

What is claimed is:

1. A method of controlling power consumption in a terminal, the method comprising:
   receiving first data from at least one device, by a main processor;
   transmitting second data based on the received first data to a sub processor, by the main processor;
   receiving the second data from the main processor, and determining whether the main processor is in a sleep state, by the sub processor; and
   when it is determined that the main processor is in the sleep state:
      maintaining the sleep state of the main processor, receiving the first data from the at least one device, controlling the at least one device based on the received first data and second data, and outputting third data, based on the first data and the second data, as data for controlling a synchronization process, by the sub processor.

2. The method of claim 1, further comprising transmitting the third data to a communication module, by the sub processor.

3. The method of claim 2, wherein the second data is connection information of the first data and the communication module.

4. The method of claim 1, further comprising outputting the third data to an interface, by the sub processor.

5. The method of claim 1, further comprising controlling the at least one device by previously setting an operation time of at least one of the main processor and the sub processor.

6. A method of controlling a power consumption in a terminal, the method comprising:
   receiving first data from at least one device, by a main processor;
   determining a state of the main processor;
   receiving second data based on the first data from the main processor, by the sub processor, during a predetermined time before entering a sleep state of the main processor; and
   when the main processor is in the sleep state:
      maintaining the sleep state of the main processor, receiving the first data from the at least one device, controlling the at least one device based on the received first data and second data, and outputting third data, based on the first data and the second data, as data for controlling a synchronization process, by the sub processor.

7. The method of claim 6, further comprising transmitting the third data to a communication module, by the sub processor.

8. The method of claim 6, further comprising outputting the third data to an interface, by the sub processor.

9. The method of claim 6, further comprising controlling the at least one device by previously setting an operation time of at least one of the main processor and the sub processor.

10. An apparatus of controlling a power consumption in a terminal, the apparatus comprising:
    a main processor and;
    a sub processor,
    wherein the main processor is configured to receive first data from at least one device, to control the at least one device based on the first data, and to transmit second data based on the first data to the sub processor, and
    the sub processor is configured to receive the second data from the main processor, to determine whether the main processor is in a sleep state, and when it is determined that the main processor is in the sleep state, to maintain the sleep state of the main processor, to receives the first data from the at least one device, to control the at least one device based on the received first data and second data, and output third data, based on the first data and the second data, as data for controlling a synchronization process.

11. The apparatus of claim 10, wherein the sub processor is configured to transmit the third data to a communication module.

12. The apparatus of claim 10, wherein the sub processor is configured to output the third data to an interface.

13. The apparatus of claim 10, wherein the sub processor is configured to control the at least one device by previously setting an operation.

14. The apparatus of claim 12, wherein, when it is determined that the main processor is not in the sleep state, outputting the third data as data for a state of the at least one device.

* * * * *